United States Patent
Ryan et al.

(10) Patent No.: US 10,150,239 B2
(45) Date of Patent: *Dec. 11, 2018

(54) EXTRUDER FOR THREE-DIMENSIONAL ADDITIVE PRINTER

(71) Applicant: Western Digital Technologies, Inc., Irvine, CA (US)

(72) Inventors: Robert P. Ryan, Mission Viejo, CA (US); Dean Mitcham Jenkins, La Canada-Flintridge, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 261 days.

This patent is subject to a terminal disclaimer.

(21) Appl. No.: 14/982,706

(22) Filed: Dec. 29, 2015

(65) Prior Publication Data

US 2017/0182701 A1   Jun. 29, 2017

(51) Int. Cl.
*B29C 47/12* (2006.01)
*B29C 64/209* (2017.01)
(Continued)

(52) U.S. Cl.
CPC ........ *B29C 47/124* (2013.01); *B29C 47/0014* (2013.01); *B29C 47/122* (2013.01);
(Continued)

(58) Field of Classification Search
CPC ... B29C 47/122; B29C 47/124; B29C 47/165; B29C 47/16; B29C 47/18;
(Continued)

(56) References Cited

U.S. PATENT DOCUMENTS 3,358,329 A * 12/1967 Martin ............... B29C 47/0033
                                                         425/464
3,932,090 A *  1/1976 Brumlik ............ A44B 18/0049
                                                         425/381
(Continued)

FOREIGN PATENT DOCUMENTS

CN       204172360 U    2/2015
EP         2349676       4/2010
(Continued)

OTHER PUBLICATIONS

International Search Report and Written Opinion issued in PCT Application No. PCT/US2016/067047, dated Mar. 14, 2017, 14 pages.
(Continued)

*Primary Examiner* — Seyed Masoud Malekzadeh
*Assistant Examiner* — Taryn Trace Willett
(74) *Attorney, Agent, or Firm* — Knobbe, Martens, Olson & Bear, LLP

(57) ABSTRACT

An extruder for a three-dimensional additive printer can be used to receive and dispense material. The extruder can include a number of different components including a nozzle with an adjustable opening configured to discharge material. The nozzle can be configured to be moved and rotated so as to align the adjustable opening with a plurality of paths along which the material is configured to be deposited for generating a three-dimensional object. The adjustable opening can comprise a first orifice and an obstruction member configured to move with respect to the first orifice. The position of the obstruction member can adjust the size of the opening area of the adjustable opening.

26 Claims, 10 Drawing Sheets

(51) Int. Cl.
*B29C 47/00* (2006.01)
*B29C 47/92* (2006.01)
*B29C 64/106* (2017.01)
*B29C 64/20* (2017.01)
*B29C 47/30* (2006.01)
*B33Y 30/00* (2015.01)

(52) U.S. Cl.
CPC ............ *B29C 47/92* (2013.01); *B29C 64/106* (2017.08); *B29C 64/20* (2017.08); *B29C 64/209* (2017.08); *B29C 47/30* (2013.01); *B29C 2947/926* (2013.01); *B29C 2947/92571* (2013.01); *B29C 2947/92609* (2013.01); *B33Y 30/00* (2014.12)

(58) Field of Classification Search
CPC ............ B29C 67/0085; B29C 67/0096; B29C 67/0055; B29C 67/0051; B29C 67/0059; B29C 67/0062; B29C 67/0066; B29C 67/007; B29C 67/0074; B29C 67/0077; B29C 67/0081; B29C 67/0088; B29C 67/0092; B33Y 10/00; B33Y 30/00; B33Y 40/00; B33Y 99/00
See application file for complete search history.

(56) References Cited

U.S. PATENT DOCUMENTS

| | | | |
|---|---|---|---|
| 4,256,685 A * | 3/1981 | Vassar | B29C 47/124 264/167 |
| 4,734,240 A | 3/1988 | Chung et al. | |
| 5,102,602 A | 4/1992 | Ziegler | |
| 5,110,529 A | 5/1992 | Arima | |
| 5,162,090 A * | 11/1992 | Arima | B29C 47/0023 264/167 |
| 5,169,589 A | 12/1992 | Francoeur et al. | |
| 5,190,770 A * | 3/1993 | Tashiro | A21C 11/103 264/167 |
| 5,961,759 A | 10/1999 | Schubert | |
| 6,030,199 A | 2/2000 | Tseng | |
| 6,251,340 B1 | 6/2001 | Tseng | |
| 6,257,863 B1 * | 7/2001 | Otte | B29C 47/0033 425/191 |
| 6,357,855 B1 | 3/2002 | Kerekes et al. | |
| 6,459,069 B1 * | 10/2002 | Rabinovich | B22F 3/005 219/121.63 |
| 6,505,089 B1 | 1/2003 | Yang et al. | |
| 6,905,645 B2 | 6/2005 | Iskra | |
| 7,291,002 B2 * | 11/2007 | Russell | B29C 67/0059 264/308 |
| 8,337,191 B2 * | 12/2012 | Keller | B29C 47/92 264/46.1 |
| 8,778,252 B2 | 7/2014 | Mackie et al. | |
| 2003/0206990 A1 * | 11/2003 | Edmondson | B29C 47/0016 425/466 |
| 2005/0048180 A1 | 3/2005 | Moore et al. | |
| 2007/0228592 A1 * | 10/2007 | Dunn | B29C 64/106 264/40.4 |
| 2010/0191360 A1 * | 7/2010 | Napadensky | B29C 67/0059 700/98 |
| 2011/0081453 A1 * | 4/2011 | Axelrod | A23K 1/003 426/62 |
| 2014/0061974 A1 * | 3/2014 | Tyler | B29C 67/0055 264/401 |
| 2014/0117575 A1 | 5/2014 | Kemperle et al. | |
| 2014/0242208 A1 * | 8/2014 | Elsworthy | B29C 31/042 425/375 |
| 2014/0271964 A1 | 9/2014 | Roberts, IV et al. | |
| 2014/0291885 A1 * | 10/2014 | Etchegoyen | C23C 24/04 264/113 |
| 2014/0291886 A1 * | 10/2014 | Mark | B29C 64/106 264/163 |
| 2014/0328963 A1 * | 11/2014 | Mark | B29C 67/0088 425/143 |
| 2014/0361460 A1 | 12/2014 | Mark | |
| 2014/0363532 A1 | 12/2014 | Wolfgram | |
| 2015/0035198 A1 * | 2/2015 | Saba | B33Y 10/00 264/211.12 |
| 2015/0037446 A1 | 2/2015 | Douglass et al. | |
| 2015/0056317 A1 | 2/2015 | Chen | |
| 2015/0096717 A1 | 4/2015 | Batchelder et al. | |
| 2015/0140147 A1 * | 5/2015 | Konstantinos | B33Y 30/00 425/131.1 |
| 2015/0147421 A1 * | 5/2015 | Te | B29C 67/0055 425/78 |
| 2015/0174824 A1 | 6/2015 | Gifford et al. | |
| 2015/0352792 A1 | 12/2015 | Kanada | |
| 2015/0367375 A1 | 12/2015 | Page | |
| 2015/0367415 A1 | 12/2015 | Buller | |
| 2016/0046073 A1 * | 2/2016 | Hadas | B29C 67/0085 264/211.21 |
| 2016/0068678 A1 * | 3/2016 | Luo | C08L 75/04 264/308 |
| 2016/0144567 A1 | 5/2016 | Muller et al. | |
| 2016/0159006 A1 | 6/2016 | Wang et al. | |
| 2016/0288395 A1 | 10/2016 | Shen et al. | |
| 2016/0297104 A1 * | 10/2016 | Guillemette | B29C 64/106 |
| 2017/0036386 A1 * | 2/2017 | Planeta | B29C 47/263 |
| 2017/0050268 A1 | 2/2017 | Fujiya et al. | |
| 2017/0173884 A1 | 6/2017 | Ryan | |
| 2017/0182709 A1 | 6/2017 | Ryan et al. | |
| 2017/0232679 A1 | 8/2017 | Gardiner et al. | |
| 2017/0239884 A1 | 8/2017 | Batchelder et al. | |

FOREIGN PATENT DOCUMENTS

| | | |
|---|---|---|
| EP | 2349676 | 8/2011 |
| JP | 5445674 B2 | 3/2014 |
| KR | 10-1528850 B1 | 6/2015 |
| KR | 10-1575061 B1 | 12/2015 |

OTHER PUBLICATIONS

International Search Report and Written Opinion issued in PCT Application No. PCT/US2016/066725, dated Feb. 28, 2017, 8 pages.

Haria, Rushabh, et al. "What's Like a 3D Printer, But Also Like a Microscope?" 3D Printing Industry, Sep. 29, 2017, 3dp ri nti ng industry .co ml news/3d-p ri nti ng-ce m-crown-extrude r -273 71 l.

Slic3r, "G-code generator for 3D printers," http://slic3r.org/, downloaded on Jan. 11, 2016, pp. 1-2.

Slic3r, "Slic3r—About," http://slic3r.org/about, downloaded on Jan. 11, 2016, pp. 1-2.

Tan, James. "Multiple Extruder Design for 3D Printer." Lateral Imaging, Aug. 12, 2013, www.lateral-i.com/a-multipleextruder-on-a-rotating-tu rret-ide-fo r -fff-fdm-3d-p ri nte rs/.

* cited by examiner

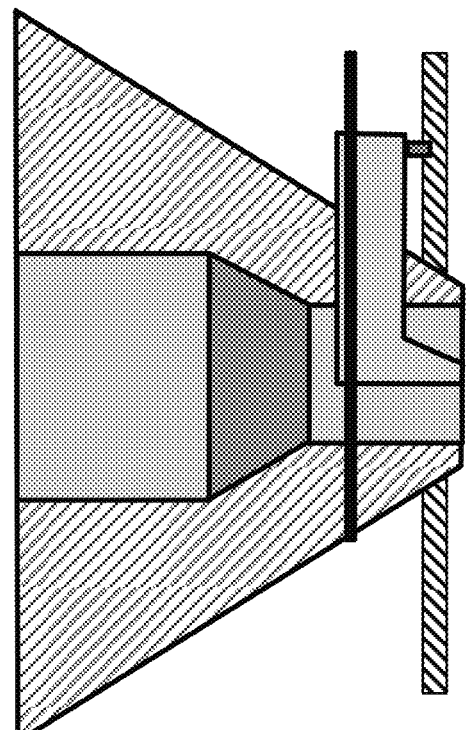
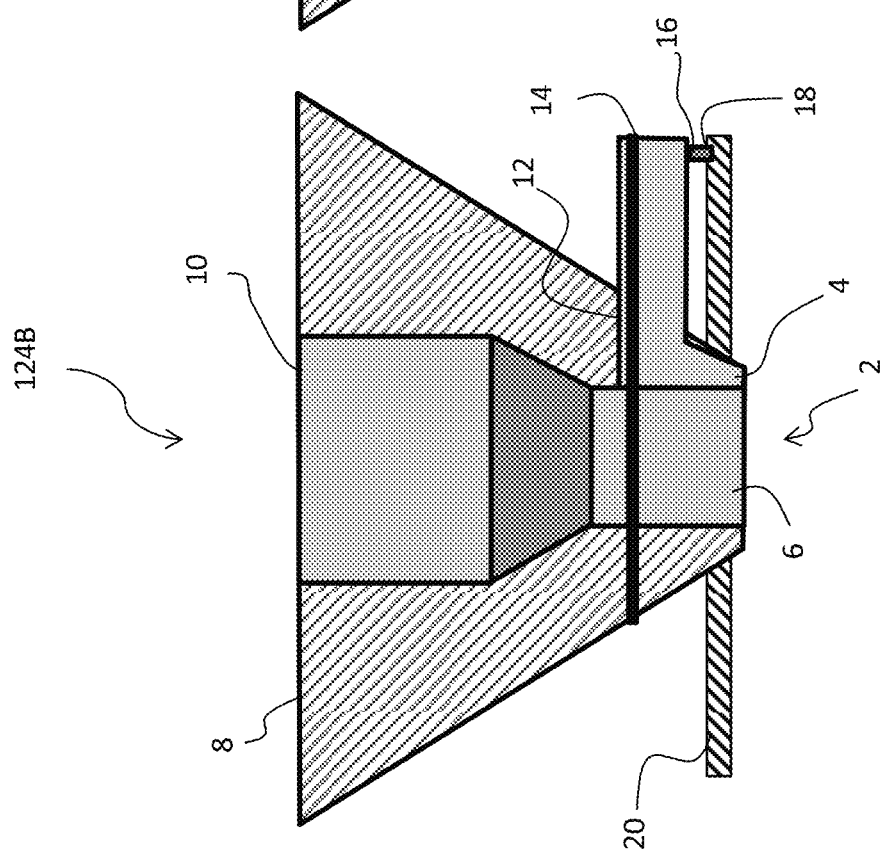

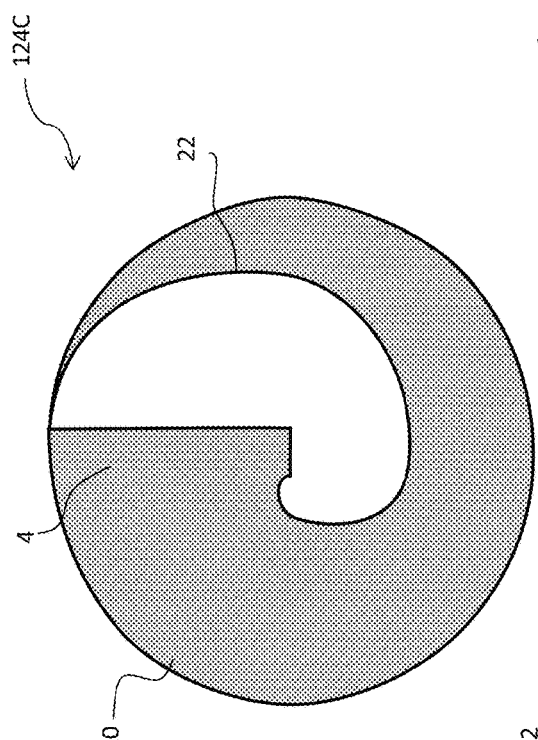
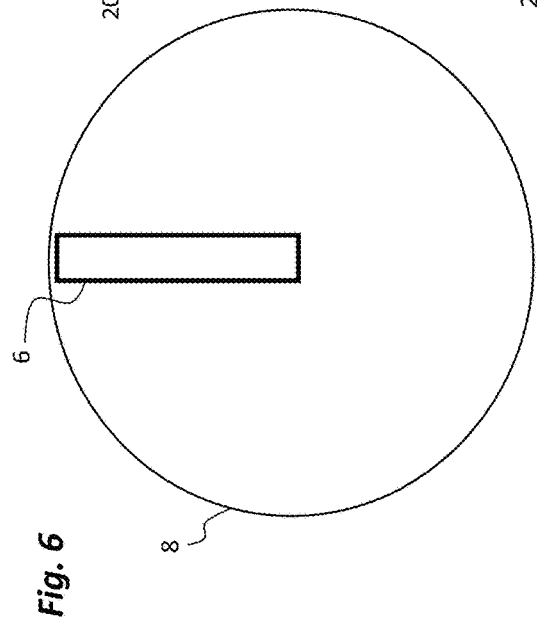
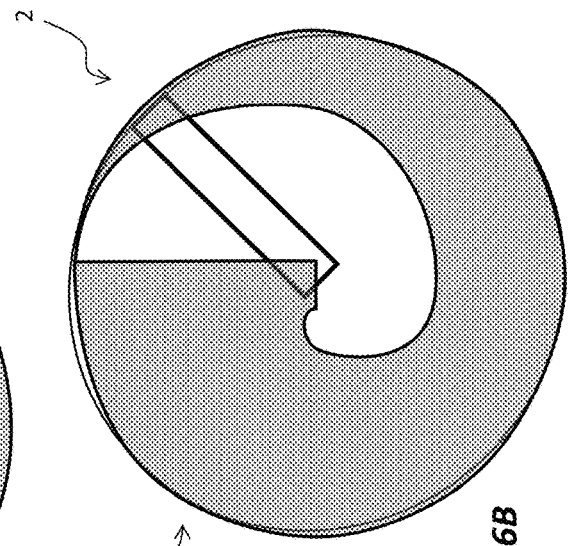
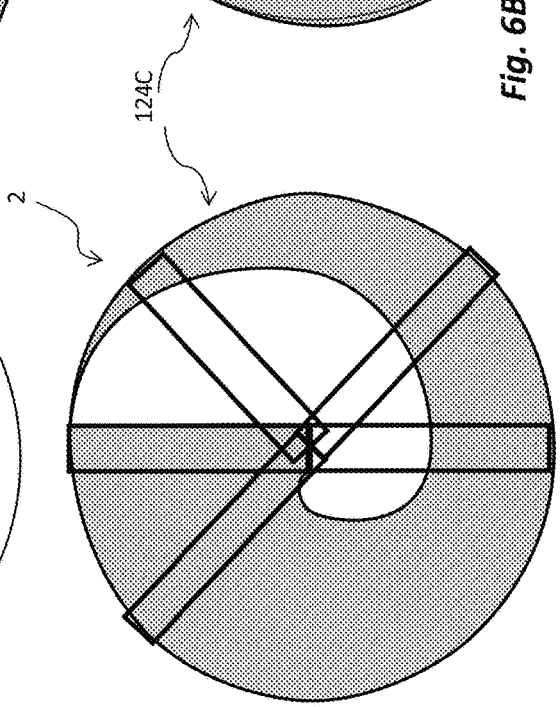
Fig. 6
Fig. 6A
Fig. 6B

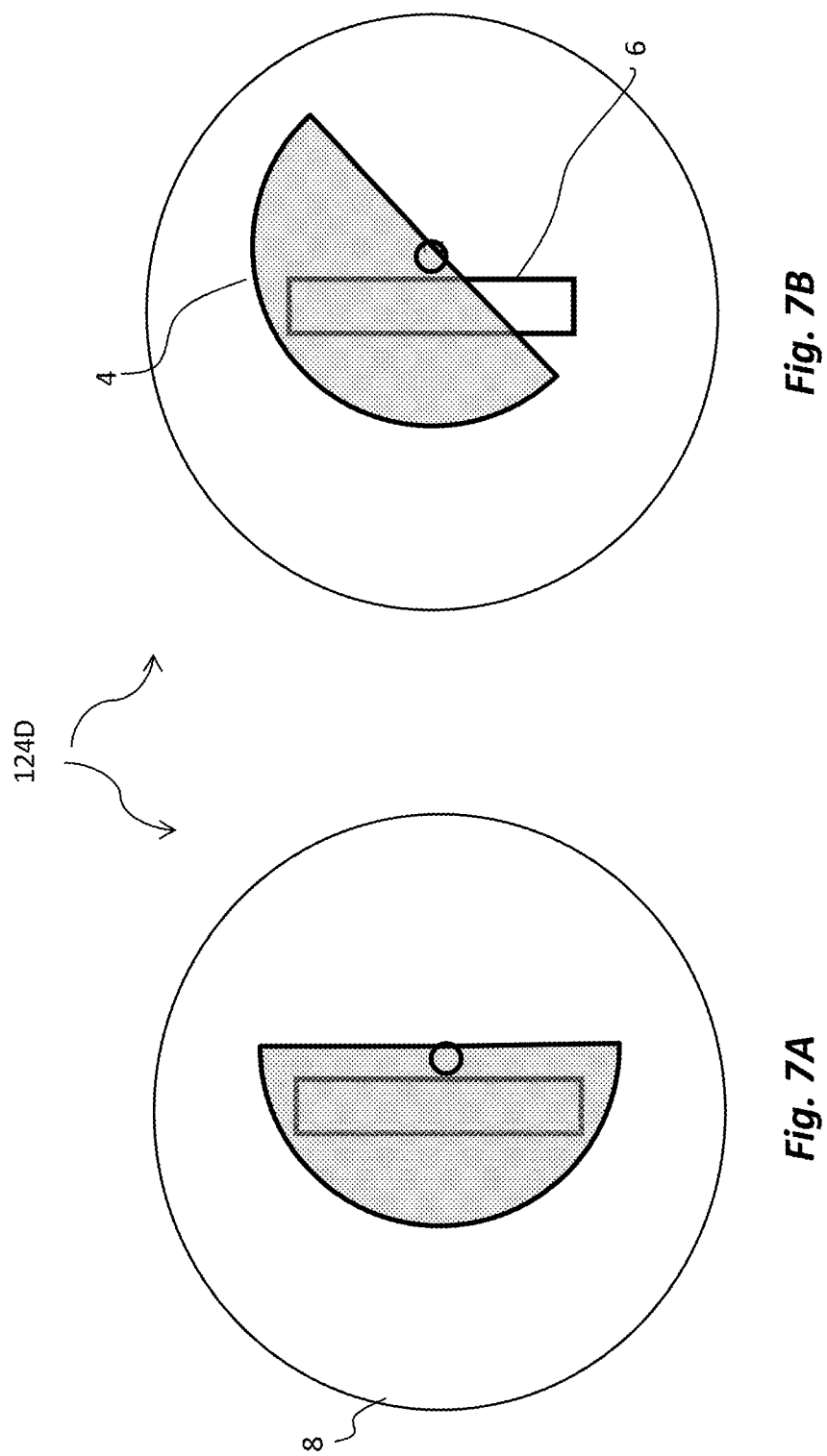

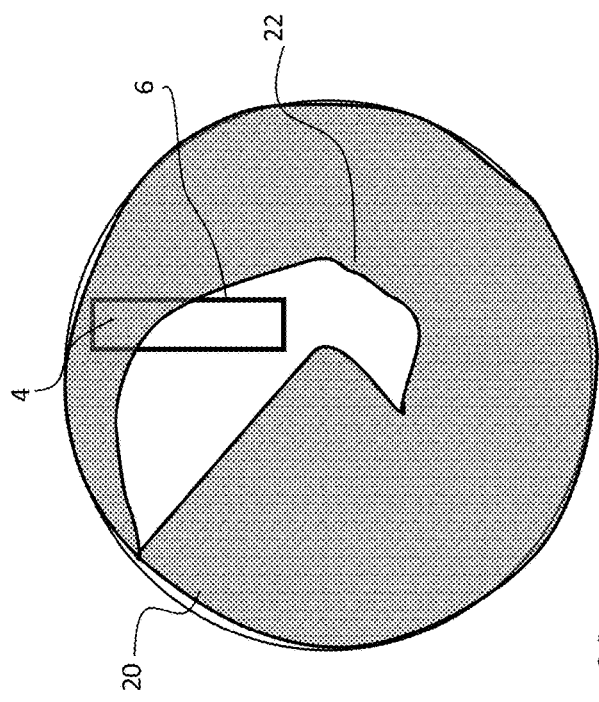
Fig. 8A
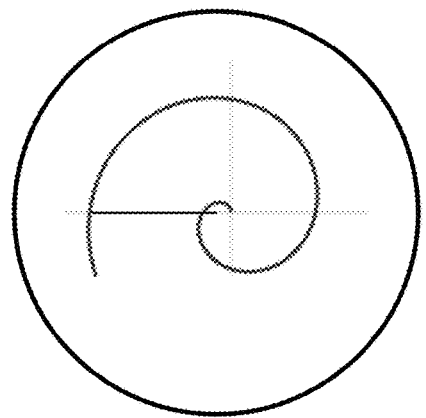
Fig. 8B
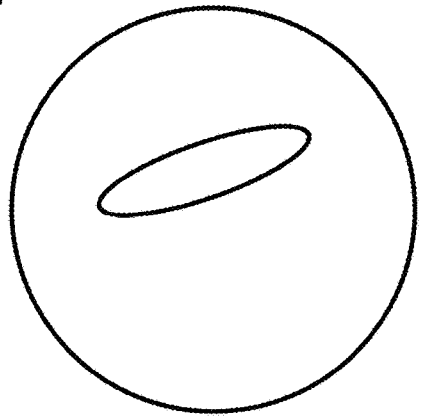
Fig. 8D
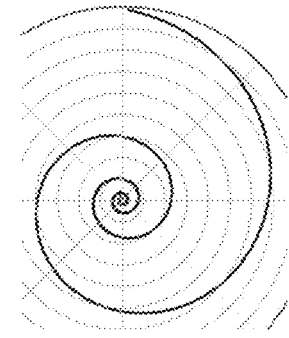
Fig. 8E
Fig. 8C

EXTRUDER FOR THREE-DIMENSIONAL ADDITIVE PRINTER

BACKGROUND

Technical Field

Certain embodiments disclosed herein relate generally to three-dimensional (3D) printing systems. In particular, extrusion heads and methods related to extrusion with the 3D printing systems are discussed.

Description of the Related Art

Three-dimensional (3D) printing, also known as additive manufacturing, includes a number of different types of processes where successive layers of material are built up to create a three-dimensional object. Some types of additive manufacturing processes involve extruding a heated material from a nozzle. Despite recent advances in 3D printing, most commercially available 3D printers are slow and inefficient.

BRIEF DESCRIPTION OF THE DRAWINGS

Various embodiments are depicted in the accompanying drawings for illustrative purposes, and should in no way be interpreted as limiting the scope of the inventions.

FIGS. 4 and 4A show a nozzle with adjustable opening in a first position.

FIGS. 5 and 5A show the nozzle with adjustable opening in a second position.

FIG. 6 illustrates another nozzle with adjustable opening.

FIGS. 6A and B show various positions of the nozzle with adjustable opening of FIG. 6.

FIGS. 7A-B show another nozzle with adjustable opening.

FIGS. 8A-E illustrate various orifice shapes.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Three-dimensional (3D) printers create 3D objects by using additive processes during which an object is created by laying down successive layers of material. Each of these layers can be seen as a thinly sliced horizontal cross-section of the final object.

3D printers range from very expensive and complex systems to the extremely simple. Thus, they are used by the casual hobbyist, as well as professionals. Many available 3D printers utilize extruders that in operation resemble hot glue guns. For example, a stepper motor pushes thermoplastic material into a hot head with a resistive heater and thermistor feedback. The extruder head temperature and speed of material are balanced to get acceptable lines of printing. For fine printing a smaller nozzle can be used. But this also requires more passes to fill in the printed structure. Thus, the size of the orifice in the nozzle can be a large factor in the time required to build the object, as well as being a factor in the level of detail possible. Generally speaking, the larger the orifice the faster the build time and the lower the level of possible detail.

In some embodiments, an improved 3D printer system has a multi-directional, rotatable extruder. The extruder can be controlled by a computer controller implementing a computer generated model (for example, represented in G-code). During operation, the extruder can be controlled to trace a path along which the material is deposited. In some embodiments, the extruder can have a non-circular orifice that can be controlled to reduce the number of passes needed to generate a 3D object. In some embodiments, the extruder additionally or alternatively includes a variable-size opening configured to deposit a controlled bead of material in order to reduce the number of passes needed to generate a 3D object.

Figure 1:
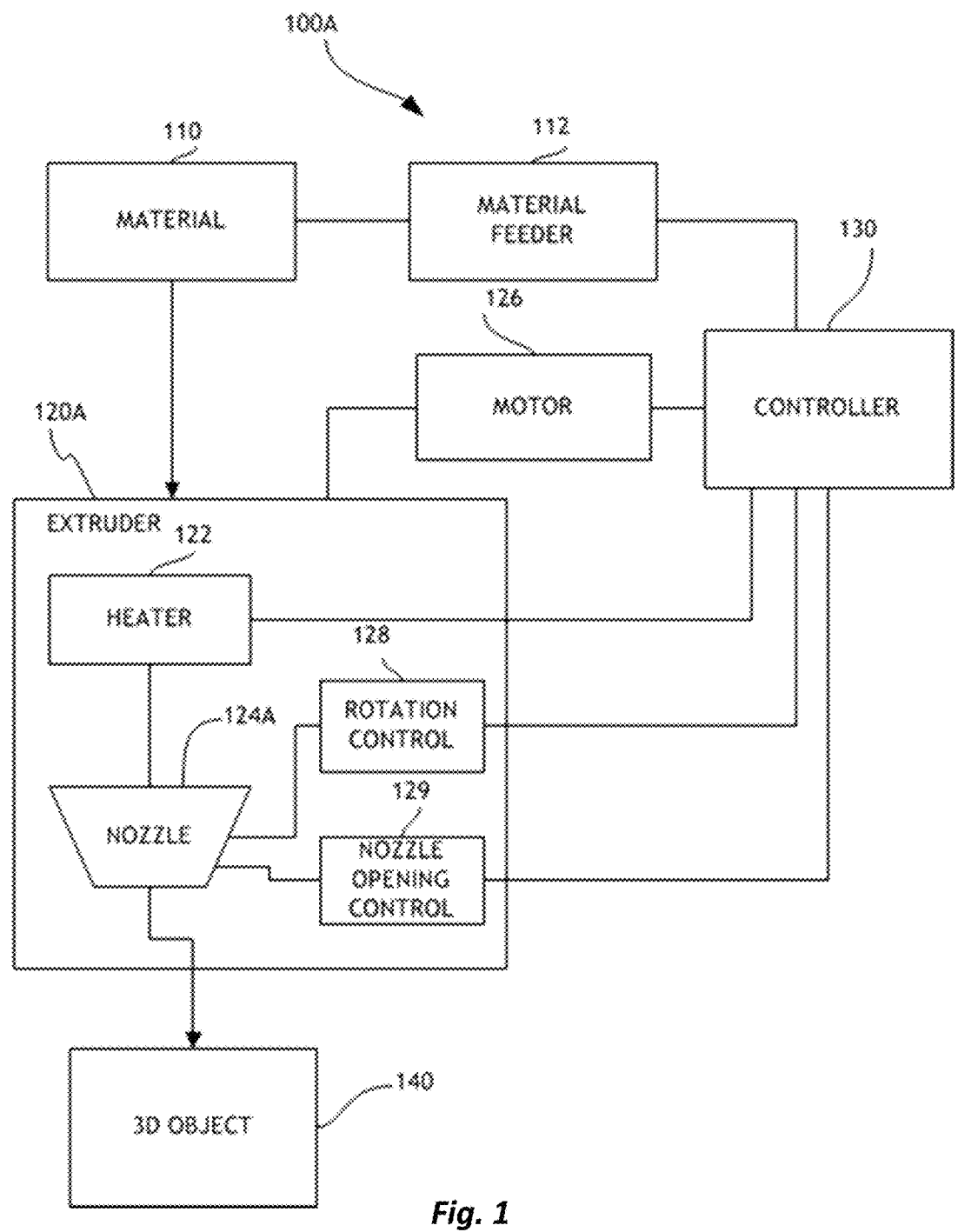
FIG. 1 shows a schematic of a 3D printing system.

FIG. 1 illustrates a 3D printing system 100A according to some embodiments of the invention. A 3D printing system 100A can include a material feeder 112, a motor 126, a controller 130 and an extruder 120A. The material feeder 112 with input from the controller 130 can control the feed rate of material 110 to the extruder 120A.

The extruder 120A can include a heater 122 and a nozzle 124A. The extruder can deposit material 110 received from the material feeder 112 along a flow path controlled by the motor 126 to create a 3D object 140.

Material feeder 112 can be a stepper motor or any other suitable actuator. Material 110 is preferably contained in a spool, but can also be in other forms, such as sticks, beads, and liquid form. Thus, the material feeder 112 can push or pull material 110 from the spool, but may also control flow in this same or in other ways from a material hopper and/or channel through which the material 110 can flow.

Material 110 can be thermoplastic, metal wire, ceramic, chocolate, and the like depending on the application. Material 110 can be fed by the material feeder to an extruder 120A.

The extruder 120A includes a heater 122 and a nozzle 124A. The tip of the nozzle 124 includes an orifice from which the material 110 is deposited. In particular, molten material heated by the heater 122 is forced out of the nozzle orifice and deposited on the 3D object 140, which can be generated layer by layer.

The nozzle 124A is moved in three dimensions by one or more motors 126. Nozzle 124A can be moved in layers, moving in two dimensions to deposit one horizontal slice or plane at a time, before moving upwards to begin a new slice. The speed of the nozzle 124A, as well as the flow of material 110 can be controlled to form a smooth, consistent plane.

In some embodiments, the 3D printing system 100A includes a rotation control 128 configured to rotate the nozzle 124A. A rotation control 128 can be used with a number of nozzle styles; it is particularly desirable where the orifice of the nozzle is a non-circular or a non-single point orifice, such as an elongated orifice. The rotation control 128 can rotate a nozzle 124A with an elongated orifice such as orifices 220, 230 shown in FIG. 2. It this way the position of the orifice can be controlled as the extruder travels along a flow path as shown in FIG. 3A.

Figure 2:
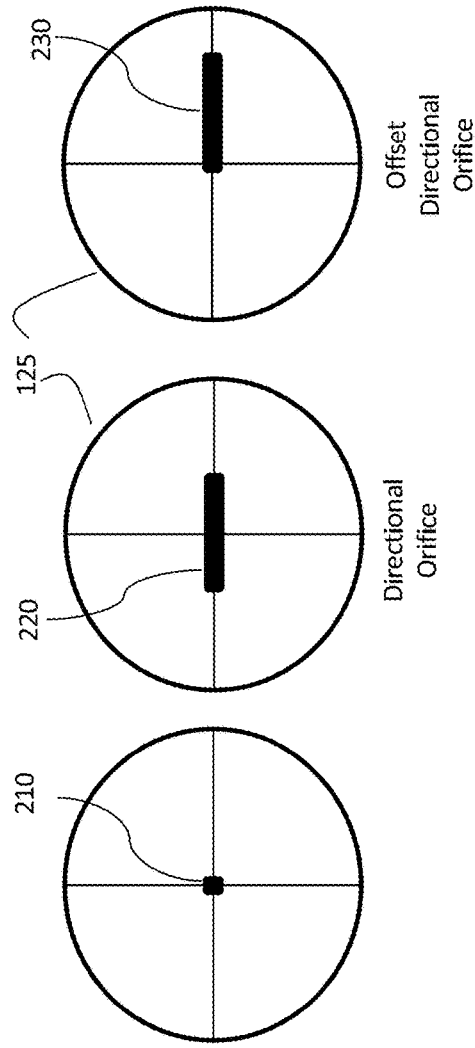
FIG. 2 shows various nozzle orifices that can be used with 3D printing systems.

FIG. 2 illustrates extruder orifices according to some embodiments of the invention. In 210, an orifice of a typical extruder nozzle is illustrated. As can be seen, small amounts of the material can be deposited from the narrow orifice 210. Improved orifices are illustrated at 220 and 230, which can correspond to the opening of the extruder 120A. Because these openings are wider than the opening 210, more material can be deposited. The orifice 230 is offset from the center. In some embodiments, alternative openings can be used, such as an opening positioned in the diagonal direction.

Figure 3A:
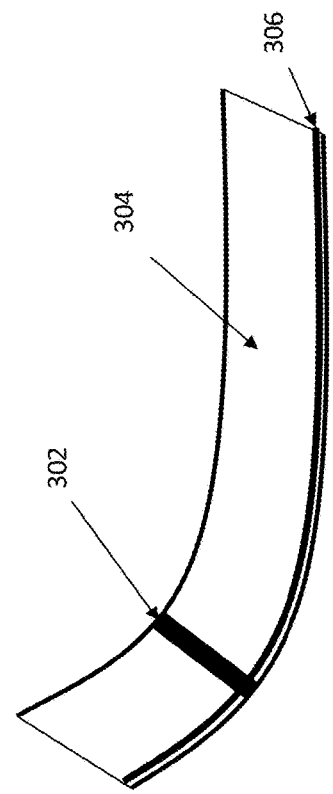
FIG. 3A illustrates a flow path of an extruder for depositing material.

FIG. 3A illustrates a flow path 306 of an extruder for depositing material. Illustrated path 306 is a desired flow path that needs to be traced by the extruder 120A. The material is deposited along area 304, which represents part of an object, such as the object 140. As can be seen, the area 304 is wider than the nozzle opening 210 illustrated in FIG. 2. It will be understood that orifice 210 would require multiple passes in order to fill in the area 304. In contrast, a wider nozzle orifice 302 can deposit material along the entire area 304 in a single pass. The wider nozzle orifice 302 can correspond to the orifice 220 or 230 illustrated in FIG. 2. As is illustrated in FIG. 3A, the path 306 is curved. The nozzle 124A can be rotated in order to trace the path and deposit the material accurately and efficiently.

Figure 3:
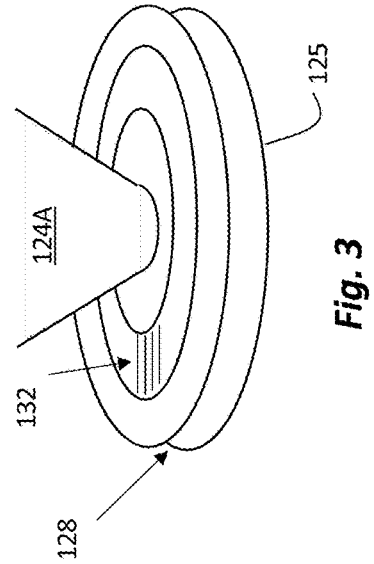
FIG. 3 shows a nozzle with parts of a rotation control.

In some embodiments, the tip of the nozzle 124A is rotated so as to control the deposition of the material 110 with a rotation control 128. As illustrated in FIG. 1, all or part of the rotation control 128 can be part of the extruder 120A. Rotation control 128 can include a motor connected to a belt, gear drive, or the like for rotating the nozzle 124A. The gear or wheel of a belt drive portion of the rotation control 128 is shown in FIG. 3. Also shown is a position control 132 in the form of rotary encoder marks which can be used with a vision system (not shown) and the controller 130 to accurately control the rotational position of the orifice. It will be understood that the position control 132 can take any number of forms. For example, the disk 125 can include a position control 132 in the form of a detent and a switch to mark the initial position. The disk 125 can be connected to a stepper motor to control the rotational position of the orifice as it moves from the initial position.

The entire nozzle 124A may rotate, or only the bottom portion. For example, a rotatable disk 125 with the orifice 220 or 230 can be positioned at the base of the extruder 124A.

An extruder with rotation control can work as follows, referring back to FIG. 1. Controller 130 controls the materials feeder 112 and the extruder 120A. For example, the controller 130 controls the rate with which the material feeder 112 feeds the material 110 into the extruder. Thus, where the material 110 is on a spool, the controller 130 and material feeder 112 can control the rate at which the spool rotates. The controller 130 can also control the heat of the heater 122. The heater 122 can be a metal block resistance heater, laser heater, or other type of heater. Thus, the material 110 can melt as it passes through the heated metal block. The controller 130 can further control the motor 126 of the extruder and the rotation control 128 to move the nozzle 124A to deposit the material 110 along a plurality of paths. Controller 130, which can be a general purpose or special purpose controller, can be connected to memory (not shown) for storing various parameters configured to operate the system 100A. Such parameters can include a computer model for generating the 3D object 140.

In some embodiments, as shown in FIG. 1, a 3D printing system 100A can have a nozzle 124A with a variable-size orifice and a nozzle opening control 129. The nozzle opening control 129 can be in addition to, part or, or instead of the rotation control 128. In one embodiment, the size of the orifice (such as the width) of the nozzle 124A is varied to control the deposition of the material 110. For example, the nozzle orifice can be a non-circular opening. As another example, the opening can be of any suitable shape or combination of shapes. Illustrated extruder 120A includes nozzle opening control 129 configured to control the size of the opening at the orifice. In one embodiment, nozzle opening control 129 is an actuator configured to vary the size of the tip. Nozzle opening control 129 can be under control of the controller 130.

As will be discussed in more detail below, an extruder for a three-dimensional additive printer can be used to receive and dispense material. The extruder can be part of the 3D printer, but can also be sold as a standalone part. The extruder can include a number of different components including a nozzle. The nozzle can have an adjustable opening configured to discharge material, the adjustable opening defining an opening area through which material can flow. The nozzle can be configured to be moved and rotated so as to align the adjustable opening with a plurality of paths along which the material is configured to be deposited for generating a three-dimensional object. The adjustable opening can comprise a first orifice, an obstruction member configured to move with respect to the first orifice, and a rotating disk. The rotating disk can be configured to rotate with respect to the first orifice to control the position of the obstruction member so as to define two or more positions of the obstruction member to adjust the size of the opening area of the adjustable opening.

Additional details of the controller 130 and control system for controlling the rotation control and the nozzle opening control are disclosed in U.S. Patent Appl. No. 62/271,144 filed Dec. 22, 2015 titled "Rotation and Nozzle Opening Control of Extruders in Printing", the disclosure of which is hereby incorporated by reference in its entirety.

What follows are various embodiments of and/or portions of extruders 120A, including all or portions of nozzles, orifices, rotation controls and nozzle opening controls. It will be understood that these components can be part of the previously described embodiments of extruders 120A and/or 3D printers 110A.

Figure 4A:
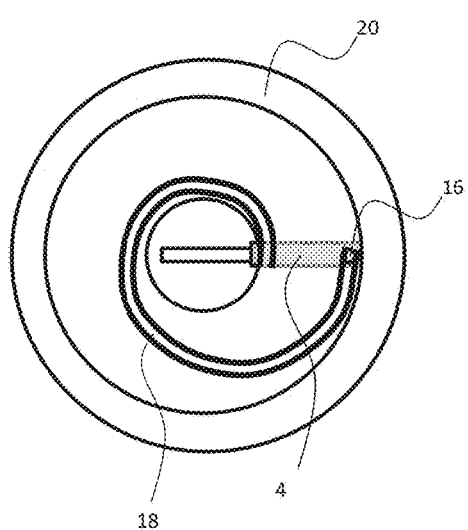
Figure 5A:
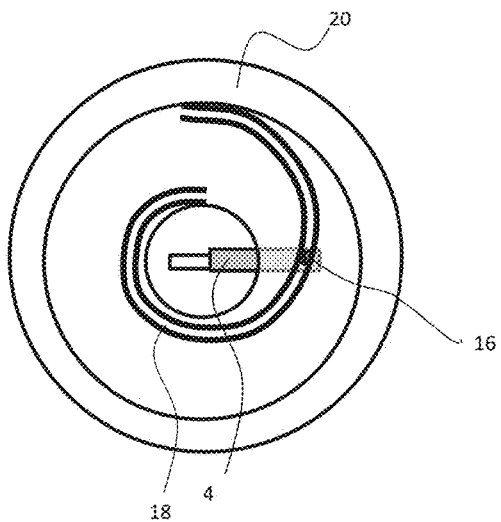

Turning now to FIGS. 4-5A, an embodiment of nozzle 124B is illustrated with a variable-size opening 2. In particular, the nozzle 124B includes a slide 4 positioned at the orifice 6 to control the size of the opening 2. FIGS. 4 and 4A show the nozzle with adjustable opening in a first position, and FIGS. 5 and 5A show the nozzle with adjustable opening in a second position.

An extruder 120A for a three-dimensional additive printer can include a nozzle 124B. The extruder can be configured to receive and dispense material 110. The nozzle 124B can include an adjustable opening 2 configured to discharge the material 110. The adjustable opening 2 can define an opening area through which material can flow. The nozzle can also include an orifice 6 and an obstruction member 4 configured to move with respect to the orifice 6.

In the illustrated embodiment, the obstruction member 4 is a slide positioned adjacent the orifice 6. The slide can be in a slot 12. The slide 4 is configured to move (linearly in the illustrated embodiment) with respect to the orifice 6 to thereby control the size of the opening area 2. The opening area is the portion of the orifice 6 that is unimpeded by the slide 4. It will be understood that the obstruction member 4 can be any structure configured to block a portion of the orifice 6 to thereby vary the opening area 2 and the amount of material that can flow through the orifice.

In the illustrated embodiment, the nozzle 124B has a nozzle body 8 with a channel 10 that extends therethough. The channel 10 ends at the orifice 6. Material 110 can flow through the channel 10. In some embodiments, the nozzle body 8 can be metal and can be part of a resistance heater 122 to melt the material 110 as it passes through the channel 10. For example, the material 110 can be a plastic filament contained on a spool that is feed into the extruder and thereby into the nozzle 124B. The resistance heater 122 can heat the filament sufficient for the nozzle body and/or obstruction member 4 to modify the amount of material that flows out of the orifice. The filament is also heated sufficient for it to fuse to material that has already been laid down to create the 3D object 140.

As the nozzle 124B has an adjustable opening 2, it can be desirable for the nozzle to be moved and rotated so as to align the adjustable opening with a desired path along which the material is to be deposited for generating a three-dimensional object. Thus, the nozzle 124B can include rotation controls 128 and can be further controlled by one or more motors 126. The one or more motors 126 can control the position of the nozzle 124B generally while the rotation controls 128 can control the angular position of the opening 2. Thus, in some embodiments, the motors 126 comprise three motors, such as three servo or stepper motors. Two of the motors can control the position of the nozzle along X and Y coordinates in a Cartesian coordinate system, while the third motor can control the height of the nozzle along Z coordinates. Other coordinate systems and motor configurations can also be used.

The nozzle 124B can also include nozzle opening controls 129. The nozzle opening controls 129 can control the size of the opening area 2. For example, the opening area 2 can be set at a beginning or end of a particular deposition path and/or layer. It can also be done in real time as the nozzle moves along a deposition path. In one embodiment, a 3D printing system designed for a home hobbyist can be configured to only change the opening area 2 at the beginning or end of a particular deposition path and/or layer. In contrast a more complex and expensive 3D printing system for an industrial user can be configured to adjust the opening area 2 in real time as the nozzle moves along a deposition path.

As illustrated, the nozzle opening controls 129 can include a slide 4. The slide 4 can be positioned in a slot 12 formed in the nozzle body 8. The slide 4 can be positioned inside and/or outside of the nozzle body 8. The nozzle can include a keyway or rail system 14 to provide stability as the slide 4 moves with relation to the orifice 6. For example, the nozzle body can have a keyway and the slide can have a protrusion positioned in the keyway, which keyway and protrusion are represented schematically at 14. To increase stability, the keyway may be positioned in a rail that extends past and outside of the nozzle body as is shown.

The position of the obstruction member 4, here a slide, can be controlled in one of many ways by the nozzle opening controls 129. For example, a motor and gear system employing a rack and pinon and can used. In the illustrated embodiment, the nozzle 124B includes a rotating disk 20 configured to rotate with respect to the orifice 6 to control the position of the obstruction member 4 so as to adjust the size of the opening area of the adjustable opening 2. The rotating disk 20 can best be understood referring to both FIGS. 4 and 5, and FIGS. 4A and 5A. Reviewing these figures it can be seen that a pin 16 is positioned within a channel or slot 18 in the rotating disk 20. As the disk rotates, the pin moves within the channel which causes the slide to move in or out. The disk itself can be controlled by a gear and/or belt system connected to one or more motors. For example, as will be described in more detail below, the disk 20 can include a plurality of gear teeth. The disk can also provide a channel to receive a belt similar to that shown in FIG. 3.

Comparing FIGS. 4-4A with 5-5A it can be seen how when the disk 20 rotates the slide 4 moves linearly with respect to the orifice to change the size of the opening 2. The obstruction member 4, here a slide, can have a plurality of positions. For example, the obstruction member can move between a fully open and a fully closed position. In the fully open position, the obstruction member may not block any of the orifice 6. In the fully closed position, the obstruction member can block the orifice completely. In some embodiments the obstruction member may not have a fully blocking position. The obstruction member in a first position can define a minimum opening area and the obstruction member in a second position can define a maximum opening area. In the second position the obstruction member may or may not be blocking the orifice 6. As shown in FIG. 4, the obstruction member is not blocking the orifice so that the maximum opening area equal to and defined by the size of the orifice 6. It will be understood that an obstruction member 4 that blocks the orifice can beneficially prevent heated material from dripping onto a 3D printed object or work area. Further, the obstruction member when blocking material flow can beneficially reduce the need for adjustments by the material feeder to retract the material from the extruder at certain times during the 3D printing process.

Preferably, an axis of rotation of the rotating disk is aligned with an axis of rotation of the nozzle. In some embodiments, the axis of rotation of the rotating disk will be centered on the orifice, while the axis of rotation of the nozzle will be centered at an edge of the orifice, or some other portion of the orifice, such as the center of the minimum opening area. The rotating disk 12 and the opening 2 can be configured to rotate both together and separately.

In some embodiments, an extruder for a three-dimensional additive printer can be provided. The extruder can be configured to receive and dispense material and can comprise a nozzle with an adjustable opening configured to discharge material. The adjustable opening can define an opening area through which material can flow, the nozzle configured to be moved and further configured to be rotated so as to align the adjustable opening with a plurality of paths along which the material is to be deposited for generating a three-dimensional object. The adjustable opening can include an orifice through which material can flow, a slide adjacent the first orifice, and a rotating disk configured to rotate with respect to the orifice. The slide can be configured to move linearly with respect to the orifice to selectively obstruct and allow material flow out of the orifice. The rotating disk can control the position of the slide. The rotating disk preferably coupled to the slide such that rotation of the rotating disk causes linear movement of the slide so as to define two or more positions of the slide to adjust the size of the opening area of the adjustable opening.

According to some embodiments, a first position of the slide completely blocks the orifice to prevent material flow. The orifice can have a length and a width that are not equal.

In some embodiments, the extruder can further comprise a pin on the slide and a slot in the rotating disk. The pin can be positioned within the slot such that rotation of the rotating disk causes linear (or another type of) movement of the pin and the slide. The slot can be a spiral shaped slot, such as a logarithmic spiral. To increase stability of the slide, a rail system with a keyway and a protrusion within the keyway can be included. The slide can move within the rail system.

The extruder can be part of a three-dimensional additive printer with a heater configured to heat the material to be discharged by the nozzle and a material feeder configured to vary flow of material to the extruder. The system can further comprise at least one of a belt drive and a gear drive to control the rotation of the rotating disk. As will be described in more detail below, the three-dimensional additive printer can further include a second nozzle with a second orifice through which material can flow separate from the first orifice. The two nozzles can be part of the same extruder, or separate extruders.

Looking now to FIG. 6, another nozzle 124C with adjustable opening 2 will be described. The nozzle 124C is similar to the nozzle 124B described above with a different type of obstruction member 4. Here the obstruction member 4 is part of the rotating disk 20. As the disk 20 rotates, the obstruction member 4 moves with respect to the orifice 6 to block and/or open the orifice 6, thereby defining the opening area through which material can flow. The rotating disk 20 can include an orifice 22. Looking at FIG. 6A, various positions of the rotating disk 20 and obstruction member 4 are shown illustrating the relative positions of the orifice 6 and the second orifice 22. FIG. 6B more clearly illustrates one position of the rotating disk 20 and obstruction member 4 with respect to the orifice 6. The overlap between the two orifices can define the opening area 2. The portions of the orifice 6 are shown covered by the obstruction member 4 (represented by shading) to indicate the area of blocked flow.

It will be understood that the rotating disk can be one of many shapes. For example, the disk is illustrated in FIG. 6 as being circular, but it is not restricted to this shape. In some embodiments, the disk can be other shapes such as semi-circular, triangular, etc. FIG. 7A-B illustrates an alternative embodiment 124D where the obstruction member 4 is semi-circular. As can be seen, the obstruction member 4 does not have an orifice, but merely rotates with respect to the orifice 6 to block (FIG. 7A) and/or allow (FIG. 7B) flow. Still further, the disk can be multiple disks. For example, the adjustable opening can be formed like an iris with a plurality of disks that move in and out of the opening.

It will also be understood that the orifice 22 on the obstruction member can be any number of shapes. FIGS. 8A-E illustrate various shapes of orifice 22. For example, the orifice 22 can be triangular (FIG. 8C) or oval (FIG. 8D). The orifice can also be based on an Archimedean spiral (FIG. 8B) or a logarithmic spiral (FIG. 8E). The orifice can based on a spiral can be formed by any portion of the spiral. The spiral can define one or more boundary of the orifice.

Figure 9C:
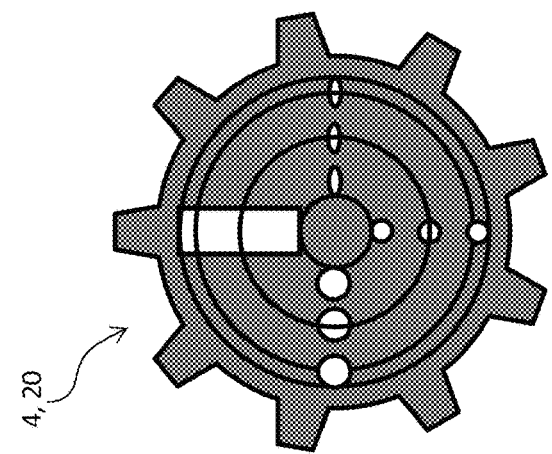
FIG. 9A-9C illustrate additional orifice designs.
Figure 9B:
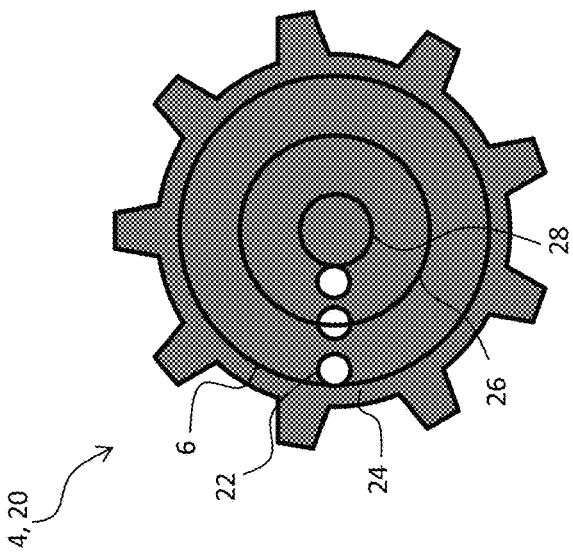
Figure 9A:
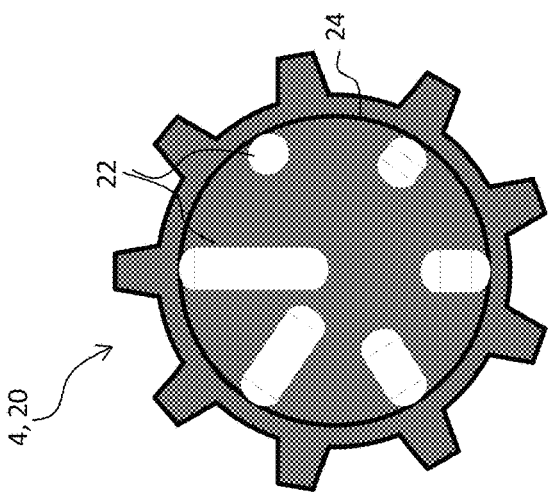

Looking now to FIGS. 9A-9C, additional embodiments of obstruction members 4 are shown. It will be understood that the obstruction member 4 can include one or more orifice 22. The one or more orifices can be the same or different shapes. The one or more orifices can also be aligned along different positions along an axis of rotation.

For example, in FIG. 9A, the disk 20 includes six orifices 22. Each of the illustrated orifices 22 are a different size, yet based on the same sized circle. The diameter of the circle defines the width of each orifice, and for all but the actual circle the length is greater than the width. Thus, for all but the actual circle the shape of the orifice is a rectangle capped by two half-circles, each on an opposing end of the rectangle. (This can be considered a type of rectangle with rounded corners.) An outer edge of each orifice is aligned with a circle 24 centered on the axis of rotation of the disk 20. It will be understood that the orifices 22 can be aligned in different manners, such as being centered with a circle 26 centered on the axis of rotation of the disk, or aligned at an inner 28 or outer 24 edge of a circle centered on the axis of rotation of the disk as is illustrated in FIG. 9B. FIG. 9C shows orifices of various shapes and sizes aligned at different positions on the disk 20.

In some embodiments, where there are more than one orifice, at least some of the orifices can be non-circular orifices. It will be understood that the first orifice 6 on the nozzle body could also be any number of shapes, including those described with reference to the orifice 22. In some embodiments, the first orifice is rectangular with rounded corners and the second orifice is one of Archimedean spiral, logarithmic spiral, and triangular. In some embodiments, the rotating disk comprises a third orifice being smaller than the second orifice. The second orifice can define a maximum flow area of the adjustable opening and the third orifice can define a minimum flow area of the adjustable opening.

According to some embodiments, an extruder for a three-dimensional additive printer is configured to receive and dispense material. The extruder can comprise a nozzle with an adjustable opening configured to discharge material. The adjustable opening defining an opening area through which material can flow, the nozzle configured to be moved and further configured to be rotated so as to align the adjustable opening with a plurality of paths along which the material is configured to be deposited for generating a three-dimensional object. The adjustable opening can comprise a first orifice through which material can flow, and a rotating disk.

The rotating disk can be configured to rotate along an axis of rotation with respect to the first orifice. The rotating disk can define an obstruction member and a second orifice, the rotating disk configured to selectively align the second orifice and obstruction member with the first orifice to allow or prevent the flow of material from the first orifice so as to define two or more positions to adjust the size of the opening area of the adjustable opening.

In a first position, the rotating disk can completely block the first orifice with the obstruction member to prevent material flow. In a second position, the rotating disk can align the first and second orifices such that the first orifice is unobstructed by the obstruction member. The rotating disk can have a number of positions between the first and second position to adjust the size of the opening as desired.

The extruder can also be part of a three-dimensional additive printer as discussed above.

From all of the above discussions, it will be understood that an extruder for a three-dimensional additive printer can be used to receive and dispense material. It can be part of the 3D printer, but can also be sold as a standalone part. The extruder can include a number of different components including a nozzle. The nozzle can have an adjustable opening configured to discharge material, the adjustable opening defining an opening area through which material can flow. The nozzle can be configured to be moved and rotated so as to align the adjustable opening with a plurality of paths along which the material is configured to be deposited for generating a three-dimensional object. The adjustable opening can comprise a first orifice, an obstruction member configured to move with respect to the first orifice, and a rotating disk. The rotating disk can be configured to rotate with respect to the first orifice to control the position of the obstruction member so as to define two or more positions of the obstruction member to adjust the size of the opening area of the adjustable opening.

The extruder can also include a heater to receive material from a material feeder. The nozzle body itself may form part of the heater, such as where the nozzle is a metal block and the heater is a resistance heater the flows electricity to the metal block.

The obstruction member can take many forms. For example, the obstruction member can be a slide or part of the disk designed to move with respect to the first orifice to block and/or allow material flow out of the first orifice. In some embodiments, the rotating disk comprises the obstruction member and a second orifice, the size of the opening area of the adjustable opening determined by the amount of overlap between the first orifice and the second orifice. The disk can include a third orifice. In some embodiments, the obstruction member comprises a slide positioned slot adjacent the first orifice, the slide can be configured to move with respect to the first orifice to thereby control the size of the opening area.

It will be understood that the obstruction member, whether a slide or disk can be swappable. For example, a multiple slides can be provided, each with different opening widths, the length being adjustable as previously described. Similarly, multiple obstruction member disks 4, 20 can be provided with orifices 22 of different sizes and/or shapes. A first obstruction member disk 4, 20 can removed and replaced with a different obstruction member disk 4, 20 having a different orifice design.

Figure 10:
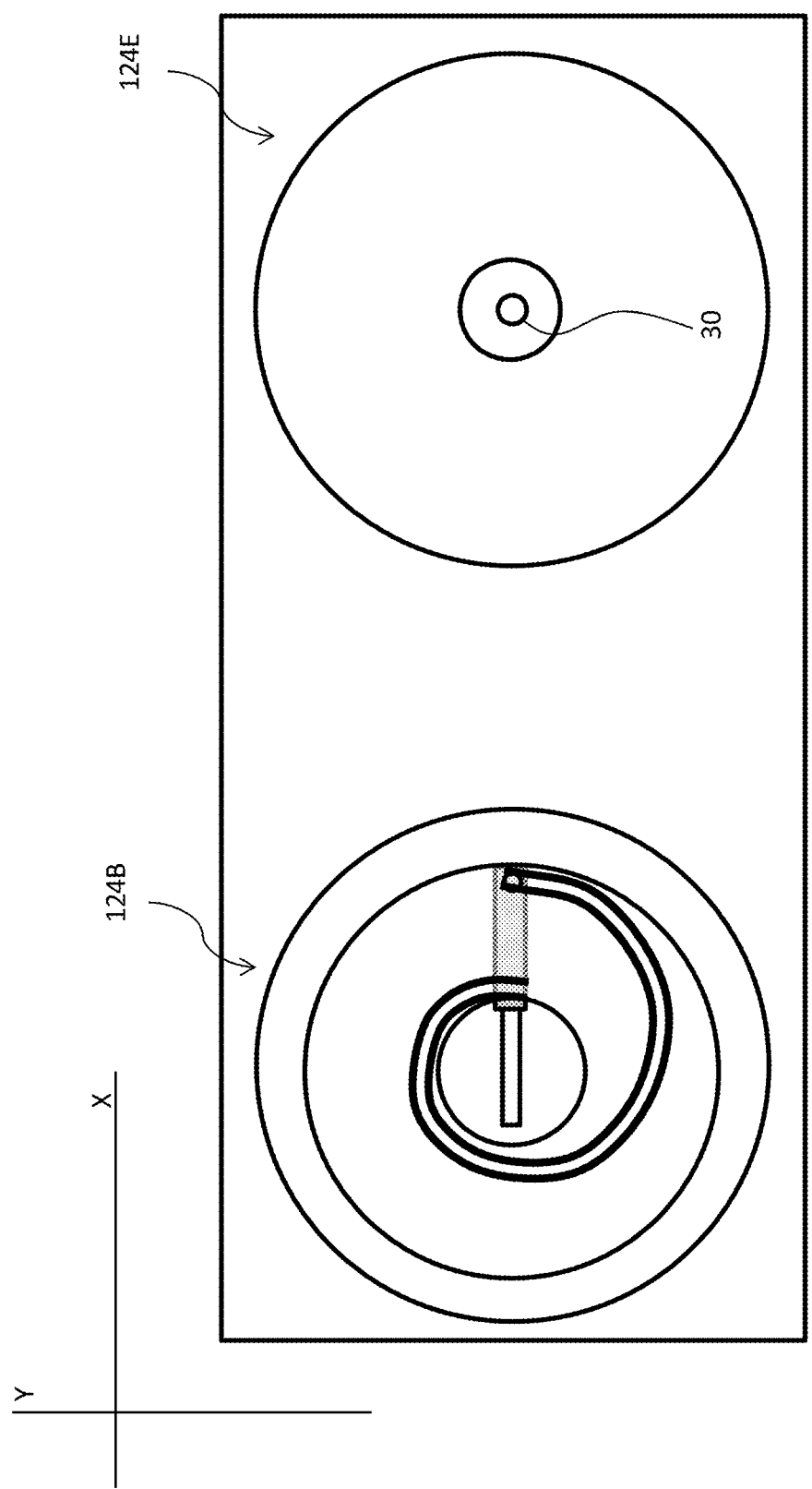
FIG. 10 is a dual nozzle.
Figure 11:
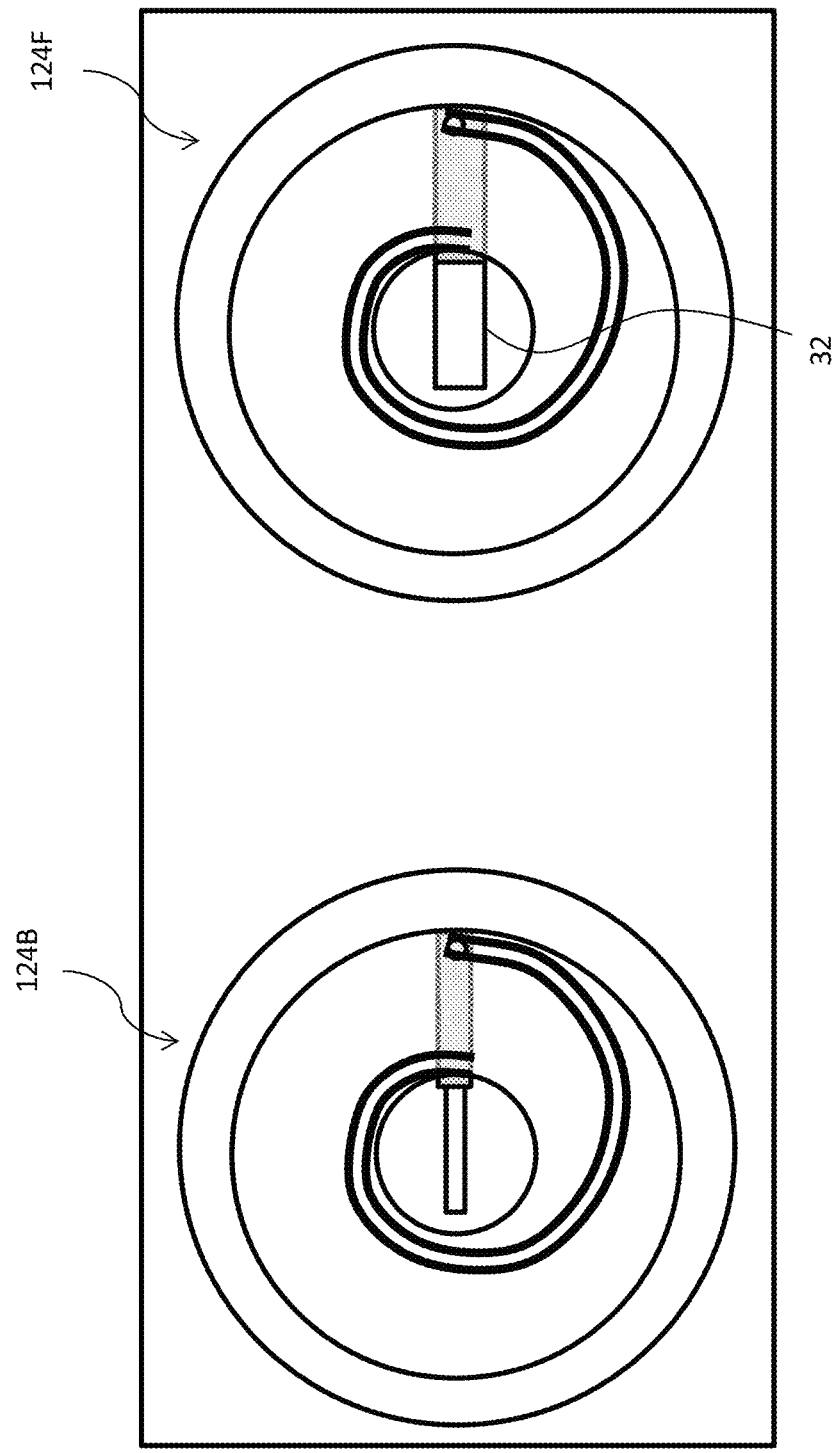
FIG. 11 is a dual nozzle, with each nozzle having an adjustable opening.

Turning now to FIGS. 10 and 11, two additional embodiments of extruder are shown. In each of these embodiments the extruder includes two nozzles. As can be seen in FIG. 10, one nozzle is identical to the nozzle 124B described above with respect to FIGS. 4-5B. The other nozzle 124E has a fixed or non-adjustable orifice 30. FIG. 11 also shows two nozzles. The first nozzle is identical to the nozzle 124B described above and the second nozzle 124F is substantially the same, but with a larger orifice 32.

The two nozzles of the various embodiments can use the same material/same type of material, but can also use different materials or types of materials. One nozzle can be used for speed and the other nozzle can be used for fine detail work. Dual nozzle extruders can also be used with different colors, and/or a structural material and a support material. The two nozzles can be coupled together so as to move together, such as along the X, Y, and Z axes. But, at least one of the nozzles can be configured to rotate, such as around the axis separate from the other nozzle. So, for example, with reference to FIG. 10, the nozzle 124B can rotate around the Z-axis (which extends out of page) while the nozzle 124E does not rotate. At the same time, the two nozzles move together along the X and Y axes, as well as moving together when raised or lowered along the Z axis. In the embodiment of FIG. 11, both nozzles can rotate about the Z-axis independently, while moving together in a along the X and Y axis and up and down along the Z axis. Thus, the orifices of the nozzles can be aligned along a single plane and stay aligned even as they move and rotate.

According to some embodiments, a three-dimensional additive printer can comprise a first extruder and a second extruder both configured to receive and dispense material, and a control system. The first extruder can include a first nozzle comprising a first orifice configured to discharge material. The second extruder can include a second nozzle comprising a second orifice configured to discharge material, the second orifice having a different size or shape than the first orifice. The three-dimensional additive printer can be configured to alternatively print from either the first extruder or the second extruder. The control system can comprise at least one motor, the control system configured to provide positional control of the first and second extruders within a coordinate system. The first and second extruders configured to move together within the coordinate system when printing, and the control system further configured to selectively rotate the first orifice when printing, separate from the second orifice.

The first and second orifices can be aligned along a single plane. The first orifice can be circular or non-circular, as can the second orifice. In some embodiments, the first orifice is rectangular with rounded corners and the second orifice is circular. The 3D printer can also include an obstruction member moveable with respect to the first orifice to control a size of the first orifice. A material feeder and one or more heaters can also be included as has been described previously.

According to some embodiments, a three-dimensional additive printer can comprise a material feeder configured to vary flow of material to be printed as a three-dimensional object; a first extruder configured to receive material from the material feeder; a second extruder configured to receive material from the material feeder, the three-dimensional additive printer configured to alternatively print from either the first extruder or the second extruder; and a control system. The first extruder can comprise a first heater configured to heat material received from the material feeder, and a first nozzle comprising a first orifice configured to discharge the heated material. The second extruder can comprise a second heater configured to heat material received from the material feeder; and a second nozzle comprising a second orifice configured to discharge the heated material, the second orifice being smaller than the first orifice. The control system can include at least one motor, the control system configured to provide Cartesian control of the first and second extruders along X, Y, and Z axes, the first and second extruders configured to move together along the X, Y, and Z axes when printing, and further configured to selectively rotate the first orifice around the Z axis when printing.

In some embodiments, Z axis rotation of the first extruder does not rotate the second extruder. As has been discussed, the first and second orifices can be aligned along a single plane.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. An extruder for a three-dimensional additive printer, the extruder configured to receive and dispense material comprising:
   a nozzle comprising an adjustable opening configured to discharge material, the adjustable opening defining an opening area through which material can flow, the nozzle configured to be moved and further configured to be rotated so as to align the adjustable opening with a plurality of paths along which the material is configured to be deposited for generating a three-dimensional object, the adjustable opening comprising:
      a first orifice;
      an obstruction member configured to move with respect to the first orifice, the obstruction member comprising a slide positioned adjacent the first orifice, the slide configured to move linearly with respect to the first orifice to thereby control a size of the opening area; and
   a rotating disk configured to rotate with respect to the first orifice to control a position of the obstruction member so as to define two or more positions of the obstruction member to adjust the size of the opening area of the adjustable opening; and
   a pin on the slide and a slot in the rotating disk, the pin positioned within the slot such that rotation of the rotating disk causes linear movement of the pin and the slide,
   wherein the slot has a spiral shape such that rotation of the rotating disk causes the pin to move along the spiral shape.

2. The extruder of claim 1, wherein a first position of the two or more positions of the obstruction member completely blocks the first orifice to prevent material flow.

3. The extruder of claim 1, wherein the rotating disk comprises the obstruction member and a second orifice, the size of the opening area of the adjustable opening determined by an amount of overlap between the first orifice and the second orifice.

4. The extruder of claim 3, wherein the first and second orifices are non-circular orifices.

5. The extruder of claim 4, wherein the first orifice is rectangular with rounded corners and the second orifice is one of Archimedean spiral, logarithmic spiral, or triangular.

6. The extruder of claim 3, wherein the rotating disk further comprises a third orifice, the third orifice being smaller than the second orifice.

7. The extruder of claim 6, wherein the second orifice defines a maximum size of the opening area of the adjustable opening and the third orifice defines a minimum size of the opening area of the adjustable opening.

8. The extruder of claim 6, wherein the second and third orifices are positioned on the rotating disk such that a circle passing through the center of both the second and third orifices has an axis aligned with an axis of rotation of the rotating disk.

9. The extruder of claim 1, wherein the first orifice is a non-circular orifice.

10. The extruder of claim 1, wherein the first orifice has a length and a width that are not equal.

11. The extruder of claim 1, wherein the first orifice comprises a shape that is at least one of rectangular, elliptical, triangular, Archimedean spiral, or logarithmic spiral.

12. The extruder of claim 1, wherein the nozzle further comprises a keyway, the slide having a protrusion in the keyway to provide stability as the slide moves with relation to the first orifice.

13. The extruder of claim 12, wherein the protrusion moves within the keyway as the slide moves with relation to the first orifice.

14. The extruder of claim 1, wherein an axis of rotation of the rotating disk is aligned with an axis of rotation of the nozzle.

15. The extruder of claim 1, wherein the rotating disk and the first orifice are configured to rotate both together and separately.

16. The extruder of claim 1, wherein the first orifice has a rectangular shape, and wherein the slide is configured move linearly along a planar surface of the rectangular shape.

17. A three-dimensional additive printer comprising:
   the extruder of claim 1 further comprising a heater configured to heat the material to be discharged by the nozzle; and
   a material feeder configured to vary flow of material to the extruder.

18. The three-dimensional additive printer of claim 17, further comprising at least one of a belt drive or a gear drive to control the rotation of the rotating disk.

19. An extruder for a three-dimensional additive printer, the extruder configured to receive and dispense material comprising:
   a nozzle comprising an adjustable opening configured to discharge material, the adjustable opening defining an opening area through which material can flow, the nozzle configured to be moved and further configured to be rotated so as to align the adjustable opening with a plurality of paths along which the material is configured to be deposited for generating a three-dimensional object, the adjustable opening comprising:
      a first orifice through which material can flow;
      a slide positioned adjacent the first orifice, the slide configured to move with respect to the first orifice to selectively obstruct and allow material flow out of the first orifice;
      a rotating disk configured to rotate with respect to the first orifice to control a position of the slide, the rotating disk coupled to the slide such that rotation of the rotating disk causes movement of the slide so as to define two or more positions of the slide to adjust a size of the opening area of the adjustable opening; and
      a pin on the slide and a slot in the rotating disk, the pin positioned within the slot such that rotation of the rotating disk causes linear movement of the pin and the slide,
      wherein the slot has a spiral shape such that rotation of the rotating disk causes the pin to move along the spiral shape.

20. The extruder of claim 19, wherein a first position of the slide completely blocks the first orifice to prevent material flow.

21. The extruder of claim 19, wherein the first orifice has a length and a width that are not equal.

22. The extruder of claim 19, wherein the nozzle further comprises a keyway, the slide having a protrusion in the keyway to provide stability as the slide moves with relation to the first orifice.

23. The extruder of claim 19, wherein the first orifice has a rectangular shape, and wherein the slide is configured move linearly along a planar surface of the rectangular shape.

24. A three-dimensional additive printer comprising:
- the extruder of claim 19 further comprising a heater configured to heat the material to be discharged by the nozzle; and
- a material feeder configured to vary flow of material to the extruder.

25. The three-dimensional additive printer of claim 24, further comprising at least one of a belt drive or a gear drive to control the rotation of the rotating disk.

26. The three-dimensional additive printer of claim 24, further comprising a second nozzle with a second orifice through which material can flow separate from the first orifice.

* * * * *